(12) United States Patent
Kimura et al.

(10) Patent No.: US 7,619,332 B2
(45) Date of Patent: Nov. 17, 2009

(54) PERMANENT MAGNET TYPE ELECTRIC ROTATING MACHINE AND WIND TURBINE ELECTRIC POWER GENERATION SYSTEM

(75) Inventors: Mamoruo Kimura, Hitachi (JP); Kazumasa Ide, Hitachiota (JP); Motonobu Iizuka, Hitachi (JP); Shuji Mizutani, Hitachinaka (JP); Tetsuo Fujigaki, Hitachi (JP); Kengo Iwashige, Hitachi (JP); Hisato Tagawa, Mito (JP); Yusaku Maruno, Naka (JP)

(73) Assignee: Hitachi, Ltd., Tokyo (JP)

( * ) Notice: Subject to any disclaimer, the term of this patent is extended or adjusted under 35 U.S.C. 154(b) by 391 days.

(21) Appl. No.: 11/238,964

(22) Filed: Sep. 30, 2005

(65) Prior Publication Data

US 2006/0071568 A1    Apr. 6, 2006

(30) Foreign Application Priority Data

Oct. 1, 2004    (JP)    .............................. 2004-289510

(51) Int. Cl.
  H02K 1/27    (2006.01)
  H02K 1/30    (2006.01)
  H02K 9/06    (2006.01)
  F03D 9/00    (2006.01)

(52) U.S. Cl. ...................... 310/58; 310/61; 310/156.53; 310/156.56; 290/55

(58) Field of Classification Search ............ 310/156.53, 310/216–217, 58, 59, 60 A, 61; 290/54–55
See application file for complete search history.

(56) References Cited

U.S. PATENT DOCUMENTS

| 4,020,373 | A | * | 4/1977 | Yamamoto et al. ............ 310/61 |
| 4,700,096 | A |   | 10/1987 | Epars |
| 4,720,640 | A | * | 1/1988 | Anderson et al. ............. 290/43 |
| 5,710,471 | A | * | 1/1998 | Syverson et al. ............ 310/114 |
| 5,844,341 | A | * | 12/1998 | Spooner et al. ............. 310/112 |
| 6,133,663 | A | * | 10/2000 | Hoemann .................... 310/180 |
| 6,239,520 | B1 | * | 5/2001 | Stahl et al. .................... 310/61 |
| 6,894,413 | B2 | * | 5/2005 | Nakano et al. ......... 310/156.01 |
| 7,218,011 | B2 | * | 5/2007 | Hiel et al. ..................... 290/43 |

FOREIGN PATENT DOCUMENTS

| CN | 2347307 Y | 11/1999 |
| CN | 1286821 A | 3/2001 |
| JP | 10-318120 | 12/1998 |
| JP | 2000-245123 | 9/2000 |
| JP | 2001-186740 | 7/2001 |
| JP | 2002-291200 | 10/2002 |
| WO | WO99/38244 | 7/1999 |
| WO | WO03/044925 | 5/2003 |

* cited by examiner

*Primary Examiner*—Burton Mullins
(74) *Attorney, Agent, or Firm*—Antonelli, Terry, Stout & Kraus, LLP.

(57) ABSTRACT

A permanent magnet type electric rotating machine comprises a stator having a distributed winding and a permanent magnet rotor, wherein the permanent magnet rotor is provided with a wind passage in an axial direction thereof.

13 Claims, 10 Drawing Sheets

PERMANENT MAGNET TYPE ELECTRIC ROTATING MACHINE AND WIND TURBINE ELECTRIC POWER GENERATION SYSTEM

CLAIM OF PRIORITY

This application claims priority from Japanese application serial No. 2004-289510, filed on Oct. 1, 2004, the content of which is hereby incorporated by reference into this application.

DESCRIPTION OF THE INVENTION

1. Field of the Invention

The present invention relates to a permanent magnet type electric rotating machine and a wind turbine electric power generation system.

2. Related Art

Recently, introduction of wind turbine electric power generation systems is drastically expanding, and increase in capacity thereof is strongly demanded. If a size of the electric rotating machine, which has the same heat generation density as that of small sized electric rotating machines, is increased to meet the above purpose, the weight of the machine increases accordingly. From the nature of the wind turbine electric power generation system, it is difficult to lift up the heavy weight electric rotating machine to the height of about 100 m. The lifting work of the heavy machine to the position of 100 m high increases the building cost of the wind turbine power generation system. Accordingly, it is desirable to reduce the weight of the rotating machine as much as possible.

If the size of the electric rotating machine is reduced to increase heat generation density, high heat generation needs a high cooling performance, which leads to an increase of a running cost of the rotating machine. In the conventional permanent magnet type electric rotating machines have been employed as a small capacity electric rotating machine, which does not require cooling. The solution of the problem may be made into a tandem type, which leads to enlargement in the axial direction.

Japanese laid-open patent publication No. JP 2001-186740 to Kobavashi et al. discloses a wind turbine electric power generating apparatus wherein a clutch is disposed between generators whereby the shafts of the generators are connected in series or disconnected.

Japanese laid-open patent publication No. JP 10-318120 to Mivake et al. discloses a wind turbine electric power generation apparatus wherein a plurality of generators each of which is constituted by an armature as a stator and permanent magnet as a rotor interlocked with a wind turbine are connected to a rotating power shaft in a mechanically serial condition to rotate coaxially all the time. A part or all of the generators are constituted to be operated as a brake in wind energy of threshold limit value or more, while increasing or decreasing the operation number of the generators corresponding to increasing or decreasing of the wind energy.

DESCRIPTION OF THE INVENTION

Summary Of The Invention

It is an object of the present invention to provide a permanent magnet type electric rotating machine with improved cooling performance and downsized dimension, which is particularly suitable for a wind turbine electric power generation system.

One aspect of the present resides in that in the permanent magnet type electric rotating machine, the stator iron core of the stator has a distributed winding and the permanent magnet rotor has a wind passage or ventilation passage extending in its axial direction.

Another aspect of the present invention resides in that in the permanent magnet type electric rotating machine, the rotor is provided with a duct piece, whereby an axial flow and radial flow are combined.

A still another aspect of the present invention resides in that a wind turbine electric power generation system is equipped with the above mentioned permanent magnet type electric rotating machine.

According to the embodiments of the present invention, it is possible to increase a cooling efficiency of the permanent magnet type electric rotating machine and the wind turbine electric power generation system using the electric rotating machine.

DETAILED DESCRIPTION OF THE INVENTION

The reference numerals used in the embodiments are denoted as follows: stator: 1 rotor: 2, 30, 40, 60, 70; permanent magnet: 3; duct piece: 4; spider: 5, 142, 151; shaft: 6; cooling duct: 7, upper coil: 8 lower coil: 9 coil end: 10; coil: 11; stator teeth: 12; stator slot: 13; permanent magnet slot: 14; rotor iron core: 20; air cooler: 21; fan: 22; flow of cooling wind: 23; atmospheric air: 24; duct space: 25; arc shape magnet: 31; flat magnet: 41, 42; ventilation aperture: 51, 61, 71; divided permanent magnet: 82, 92, 131, 132; guide: 83; adhesive: 101; projection: 102; non-magnetic wedge: 103, 141; rotating electric machine: 111; wind turbine: 114; speed up gear: 113; wind turbine nacelle: 112; electric power converter: 115; cotter: 133; power transmission system: 116; non-magnetic metal member: 203.

The present invention will be explained in detail by reference to drawings. In figures, the same parts are indicated by the same reference numerals.

EMBODIMENT 1

Figure 1:
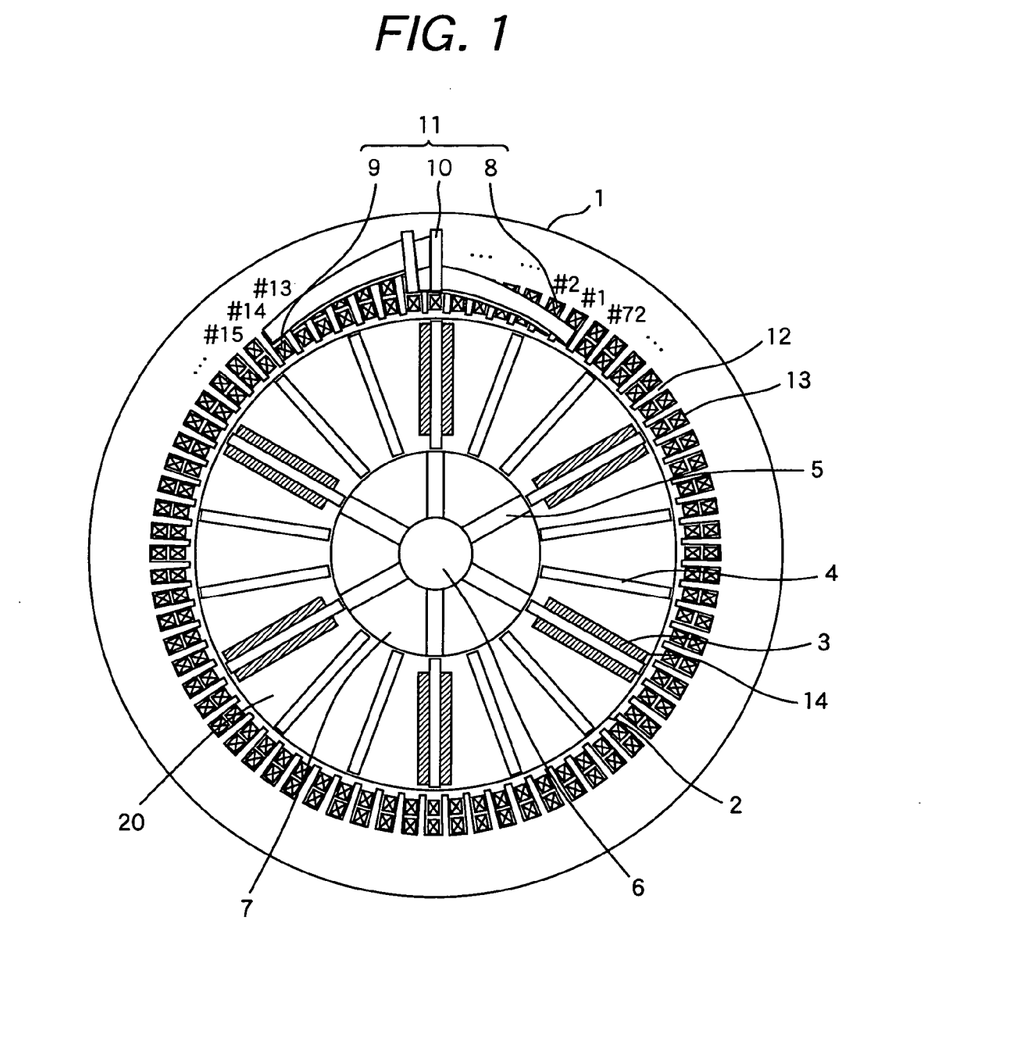
FIG. 1 is a cross sectional view of an electric rotating machine of an embodiment according to the present invention.

FIG. 1 is a cross sectional view of a generator of 6-pole and 72 slots permanent magnet type according to the present invention. This electric rotating machine is suitable for a wind turbine electric power generator of a several MW class. The generator allows a rotation speed of 1000 to 2000 rpm.

The stator 1 has a distributed winding coil wound around stator teeth 12. The coil 11 comprises three phase windings of UVW to constitute 6 poles by 72 slots. The coil 11 is constituted by upper coils 8 and lower coils 9 inserted into the slots 13 between the teeth 12 of the stator in addition to coil ends 10.

In the first embodiment, the coils 11 are wound in a manner called a full-pitch winding, whereby the coil 11 that comes out from the lower coil 9 in the slot # 1 of the # 72 slots numbered conveniently from #1 to # 72 in the anticlockwise direction goes into the upper coil 8 in the #13 slot, which is designated by adding 12 obtained by dividing the number of slots (72) with the number of poles (6) to the # 1 slot. This continues in the circumferential direction to form the three phase windings.

The rotor 2 is rotatably disposed in the center of the stator 1. The permanent magnets 3 are disposed in the permanent magnet slots 14 of the rotor iron core 20, and are arranged in the radial direction from the center of the rotor.

The rotor iron core 20 of the rotor is connected to the shaft 6 by means of spiders 5. Cooling wind that passes through the cooling duct formed by the spiders 5 passes through a radial duct formed by the duct pieces 4 at the end face of the rotor 2 thereby to let the cooling wind come out from the stator side, whereby the coil 11 is effectively cooled from the center part of the permanent magnet type electric rotating machine. As a result, it is possible to increase heat generation density of the electric rotating machine thereby to reduce the size of the machine. Since the duct pieces 4 suppress the permanent magnets 3 moving towards the shaft, the assembly of the rotating machine becomes easier.

Figure 2:
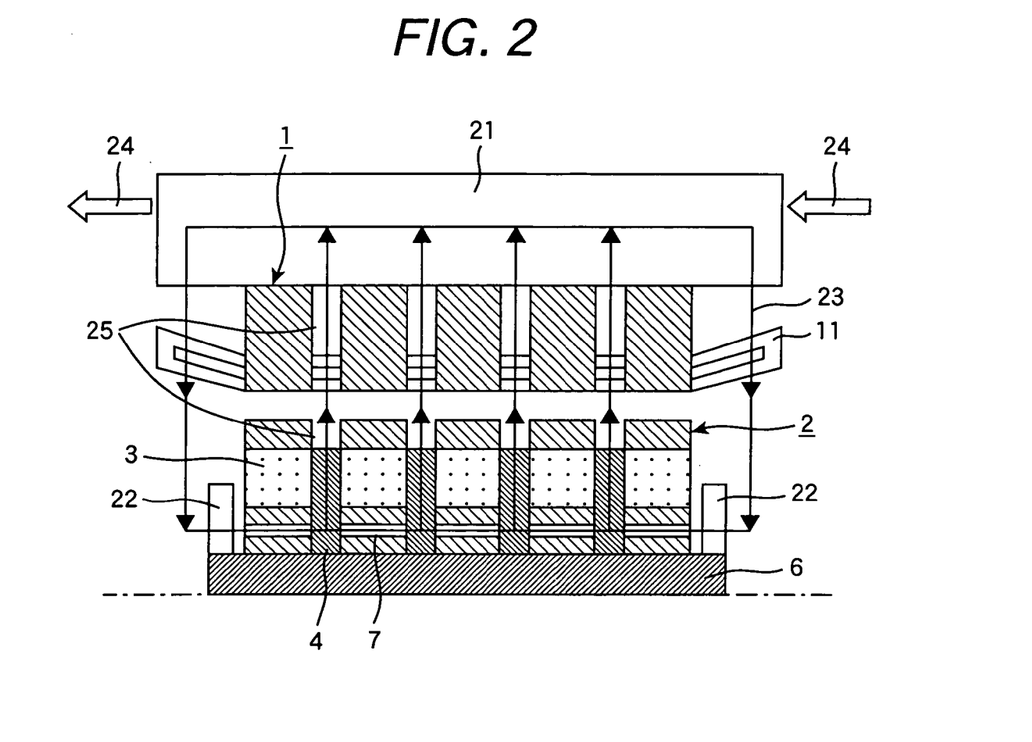
FIG. 2 is a cross sectional view of ½ the electric rotating machine shown in FIG. 1.

FIG. 2 is a ½ cross sectional view along the shaft of the rotating machine of the first embodiment of 6-poles and 72 slots. When looking at the flow of the cooling wind 23, air cooled by an air cooler 24 with the atmospheric air 24 is circulated by a fan 22 connected to the shaft 6 to pass through the cooling duct 7 and to come out from the duct space 25 formed by the duct piece 4 to return to the air cooler 21. By provision of the duct space 25, the center part of the electric rotating machine is effectively cooled to contribute downsizing of the electric rotating machine.

Figure 3:
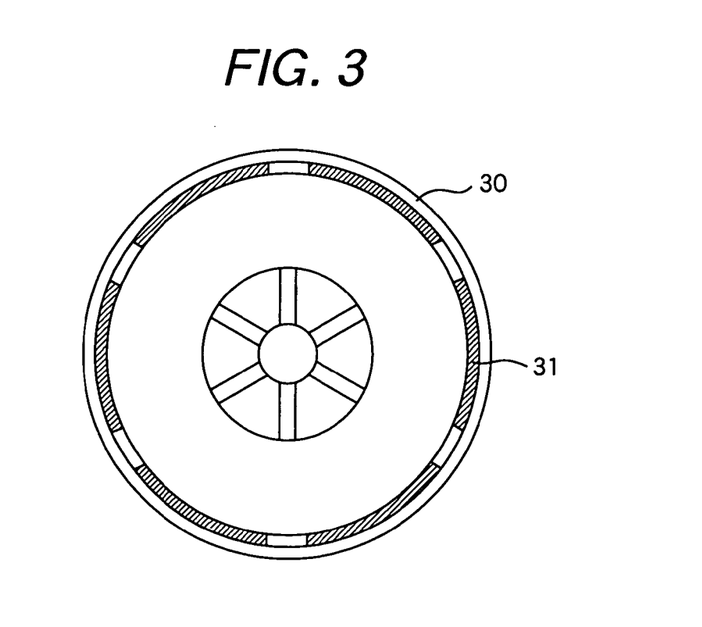
FIG. 3 is a diagrammatic sectional view of the electric rotating machine of another embodiment according to the present invention.
Figure 4:
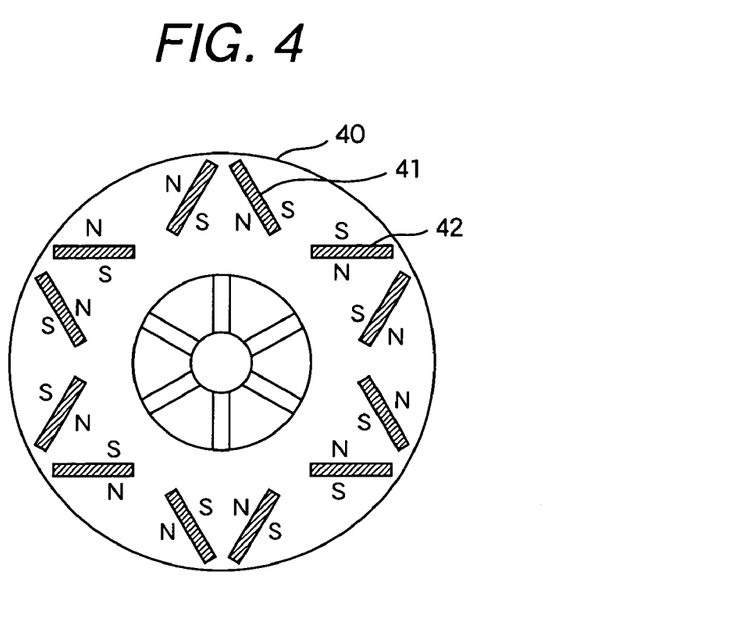
FIG. 4 is a diagrammatic sectional view of the electric rotating machine of still another embodiment according to the present invention.

In the first embodiment, the rotor 2 can be modified as shown in FIGS. 3 and 4, wherein the rotor 30 use arc shape permanent magnets 31 or the rotor 40 uses flat shape permanent magnets 41, 42, which are arranged in V-shape to oppose the same polarity of the magnets as shown in FIG. 4.

Figure 5:
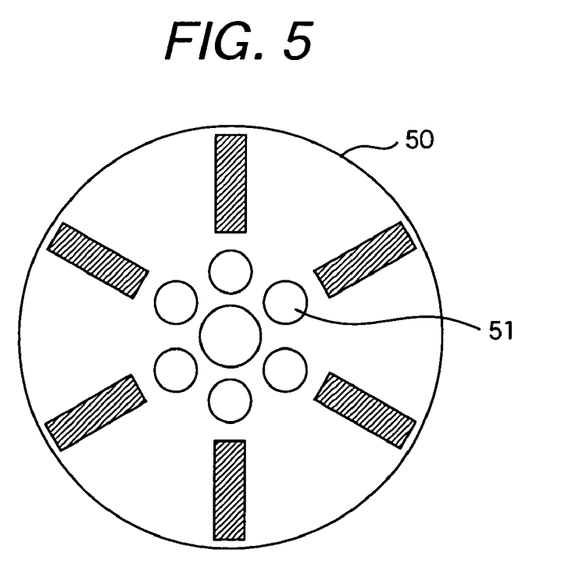
FIG. 5 is a diagrammatic sectional view of the electric rotating machine of still another embodiment according to the present invention.
Figure 6:
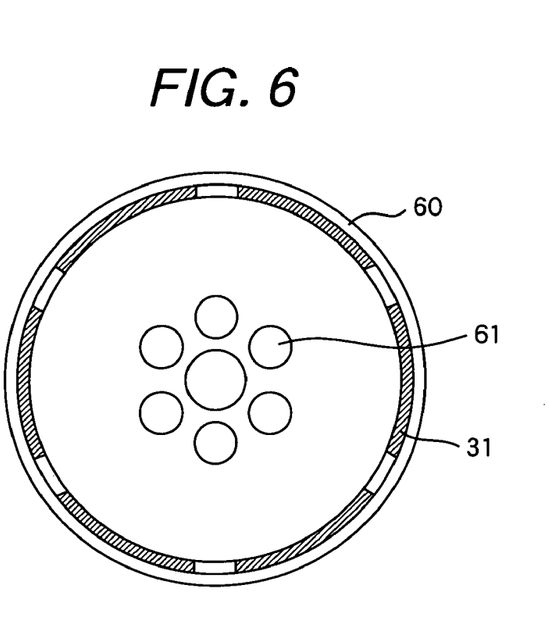
FIG. 6 is a diagrammatic sectional view of the electric rotating machine of still another embodiment according to the present invention.
Figure 7:
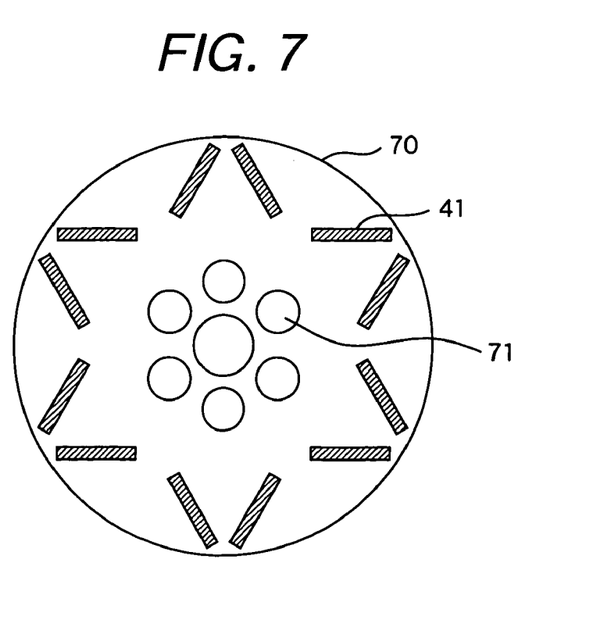
FIG. 7 is a diagrammatic sectional view of the electric rotating machine of still another embodiment according to the present invention.

Further, the rotor can be modified as shown in FIGS. 5, 6 and 7 in which spiders 5 are not used, but the rotor 50, 60 or 70 is provided with bores 51, 61 or 71 for ventilation extending along the axis of the rotor.

Figure 8:
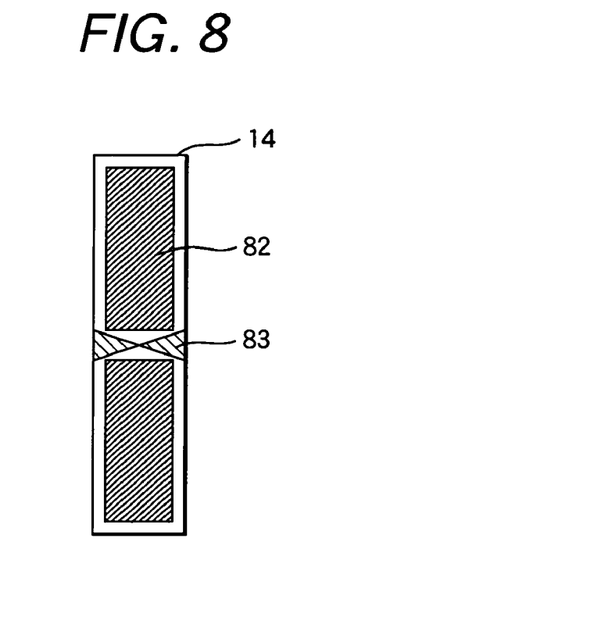
FIG. 8 is a cross sectional view of one unit of a permanent magnet and a magnet slot in the rotor of one embodiment where divided magnets are fitted in the magnet slot.
Figure 9:
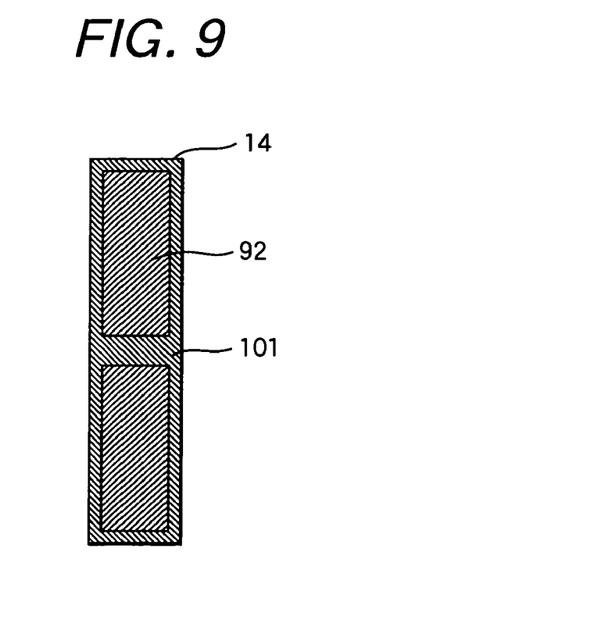
FIG. 9 is a cross sectional view of one unit of a permanent magnet and a magnet slot in the rotor of another embodiment where divided magnets are fitted in the magnet slot.

FIGS. 8 and 9 show methods of fixing divided permanent magnets in the magnet slots. In FIG. 8, the divided magnets 82 are fixed by means of a guide 83 in the magnet slot 14. In FIG. 9, the divided magnets 92 are fixed by means of an adhesive 101 in the magnet slot 14. When the magnet, the size of which is quite large in a several MW class large capacity electric rotating machine, is divided, the size of the divided magnets can be made small so that assembly of the magnets becomes quite easier.

Figure 10:
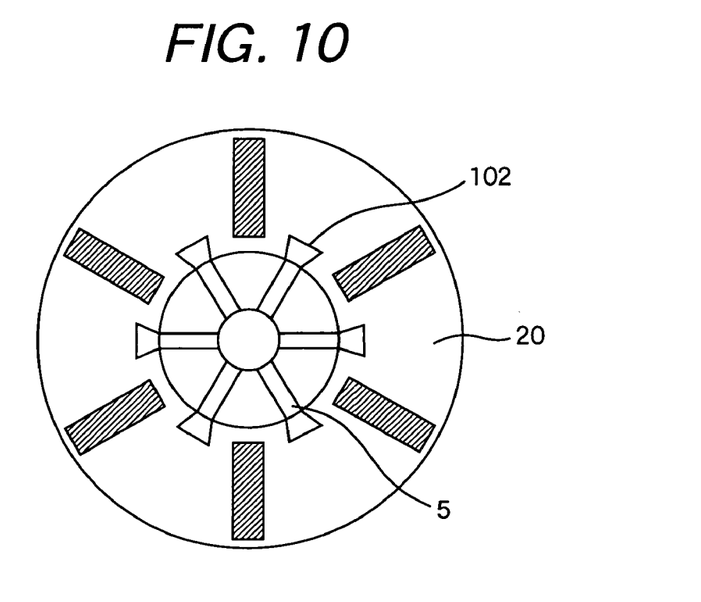
FIG. 10 is a cross sectional view of a rotor, which shows a connecting method of connecting the rotor iron core of the rotor and a spider of one embodiment.

FIG. 10 shows a connection between the rotor iron core 20 of the permanent magnet rotor and the spiders 5. Each of the spiders 5 is provided with a dovetail projection 102, whereby the spiders 5 can be easily connected to the rotor iron core 20.

Figure 11:
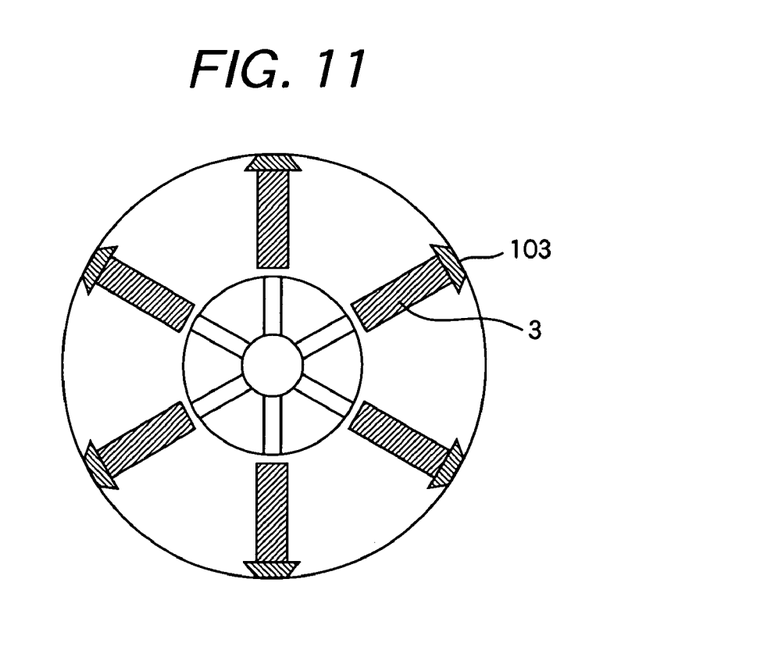
FIG. 11 is a cross sectional view of a rotor, which shows a connecting method of connecting the rotor iron core of the rotor and a spider of another embodiment.

FIG. 11 shows a method of inserting the permanent magnets 3 into the magnet slots. Slots are formed at the outer periphery of the rotor of the permanent magnet rotor, and after insertion of the magnets into the slots, tips of the magnets are fitted by means of non-magnetic wedges 103 so that the fitting of the magnets is performed and leakage of magnetic flux at the edges of the magnets is suppressed.

Figure 12:
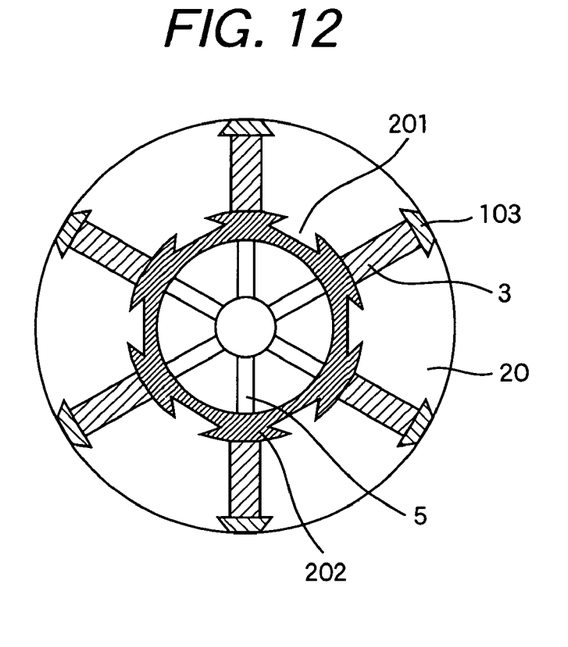
FIG. 12 is a cross sectional view of a rotor, which shows a connecting method of connecting the rotor iron core of the rotor and a spider of still another embodiment.

FIG. 12 shows a connection between the rotor iron core 20 of the permanent magnet rotor and the spiders 5. By provision of dovetail structure projections 201 arranged toward the shaft of the rotor, a non-magnetic metal member 203 for preventing magnetic shortcut in the inner periphery of the rotor is easily connected to the inner periphery side of the rotor iron core, which is connected to the spiders.

Figure 13:
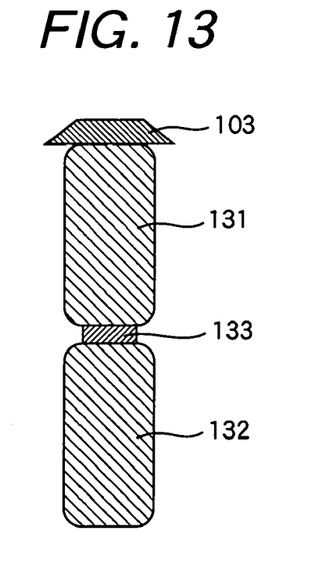
FIG. 13 is a cross sectional view of one unit for fitting divided magnets with a non-magnetic wedge in one embodiment.

FIG. 13 shows a method of fitting the divided permanent magnets by means of a non-magnetic wedge 103. The divided permanent magnets 131, 132 and non-magnetic wedge 103 are arranged in the magnet slot, and a cotter 133 is forcibly inserted between the divided magnets 131 and 132, thereby to fix the magnets in the slot.

Figure 14:
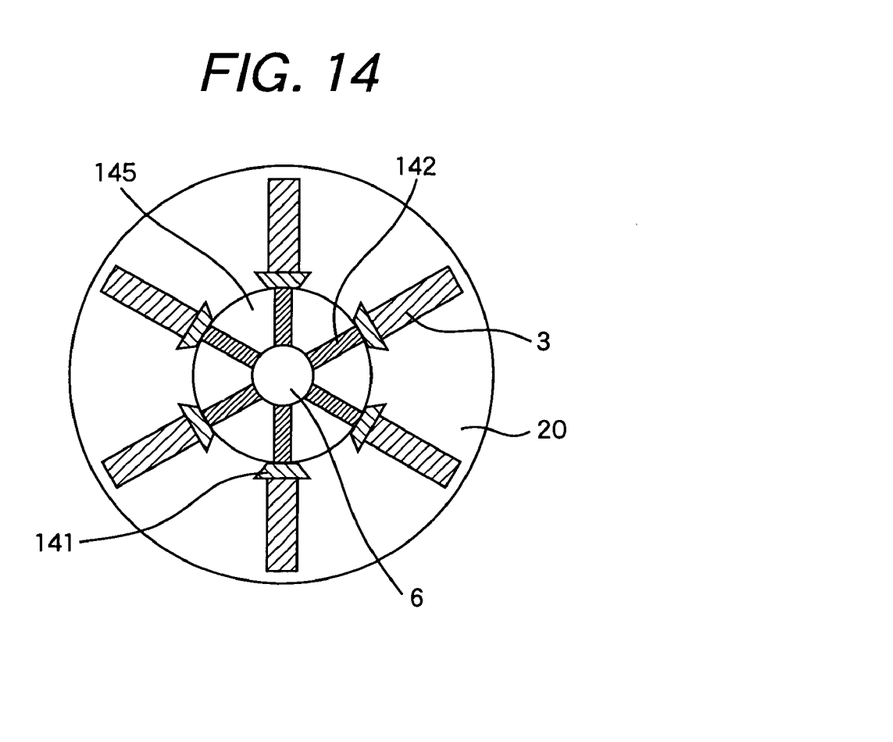
FIG. 14 is a cross sectional view of one unit for fitting divided magnets with a non-magnetic wedge in another embodiment.

FIG. 14 shows a figure of connection between the rotor iron core 20 and the shaft 6, wherein the rotor iron core 20 is provided with a bore 145 in the center part thereof. The non-magnetic wedges 141 are inserted into the inner bore 145 to fix the permanent magnets 3. The non-magnetic wedges 141 are connected to the shaft 6 by means of the spiders 142. As a result, fixation of the magnets and prevention of magnetic flux leakage at the edge of the magnets are performed simultaneously.

Figure 15:
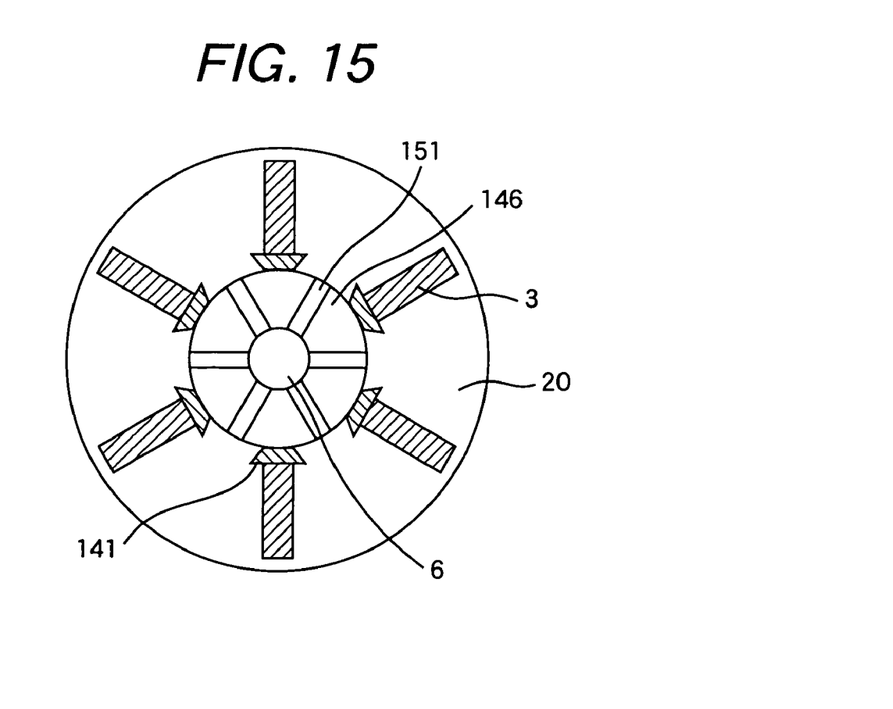
FIG. 15 is a cross sectional view of one unit for fitting divided magnets with a non-magnetic wedge in still another embodiment.

FIG. 15 shows connection between the rotor iron core 20 and the shaft 6 where an inner bore 146 is formed in the permanent magnet rotor. The non-magnetic wedges 141 are inserted into the inner bore 145 to fix the permanent magnets 3. The rotor iron core 20 is connected to the shaft 6 by means of the spiders 151. As a result, fixation of the magnets and prevention of magnetic flux leakage are conducted simultaneously, and the connection between metallic members is performed.

EMBODIMENT 2

Figure 16:
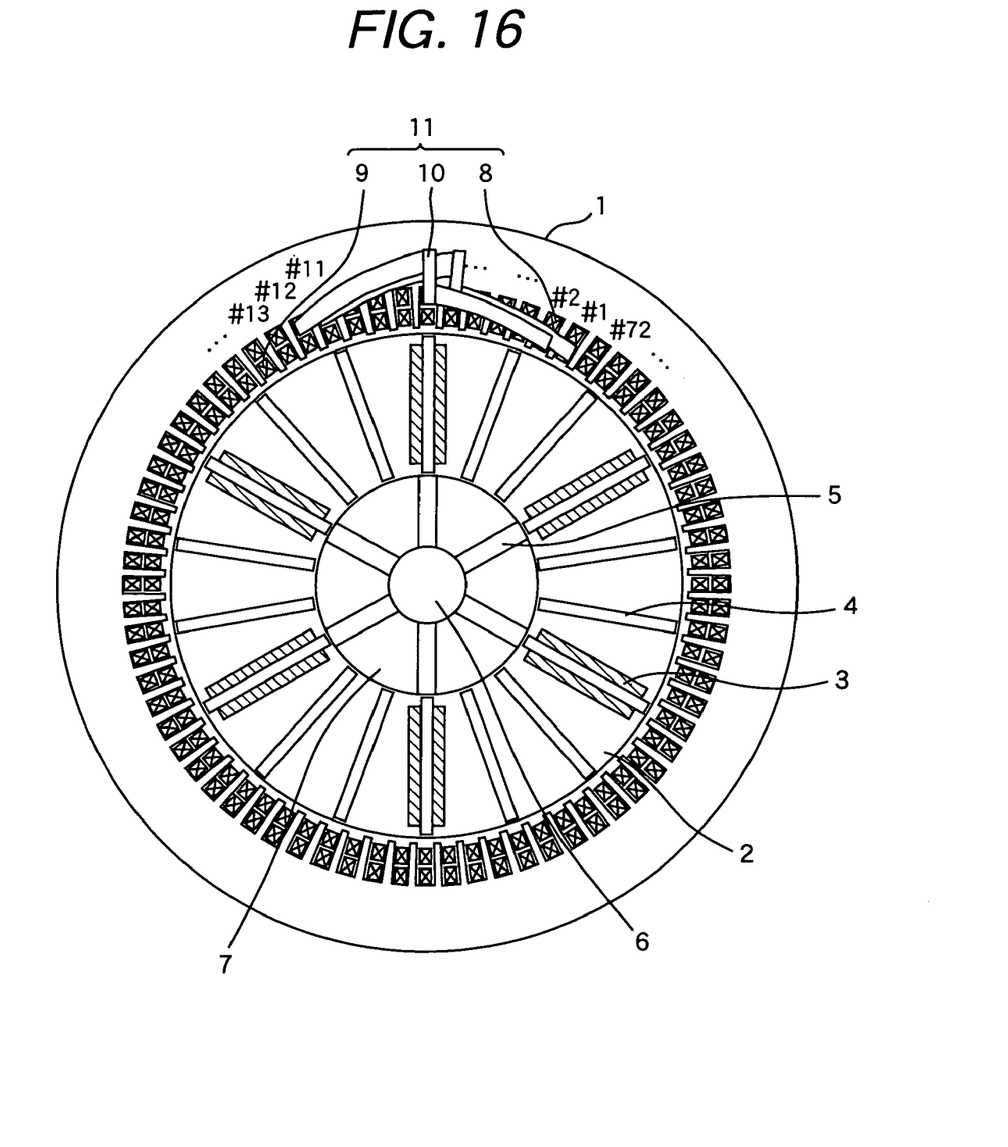
FIG. 16 is a cross sectional view of a permanent magnet type electric rotating machine of another embodiment according to the present invention.

FIG. 16 shows a cross sectional view of a second embodiment of a generator of a 6-poles and 72 slots permanent magnetic type electric rotating machine according to the present invention. The stator 1 is a distribution winding stator that has coils 11 wound distributedly on the stator teeth 12. The coils 11 have three phase windings for UVW to electrically constitute 6 poles in 72 slots. The coils 11 are constituted by the upper coil 8 and the lower coil 9 disposed in the stator slots 13 between the stator teeth 12 and coil ends 10.

In the second embodiment, the coils 11 are wound in a manner called a short-pitch winding. The coil that comes out from the lower coil 9 in the # 1 slot of the slots #1 to # 72, which are numbered conveniently in the anti-clockwise direction for the stator slots 13 enters into the upper coil 8 in # 11 slot, to which 10 that is less than 12 obtained by dividing the number 72 with the number of poles 6. This continues in the circumferential direction to form the three phase windings. Instead of the stator 1 in the first embodiment, the stator 1 in this embodiment would bring about the same results.

EMBODIMENT 3

Figure 17:
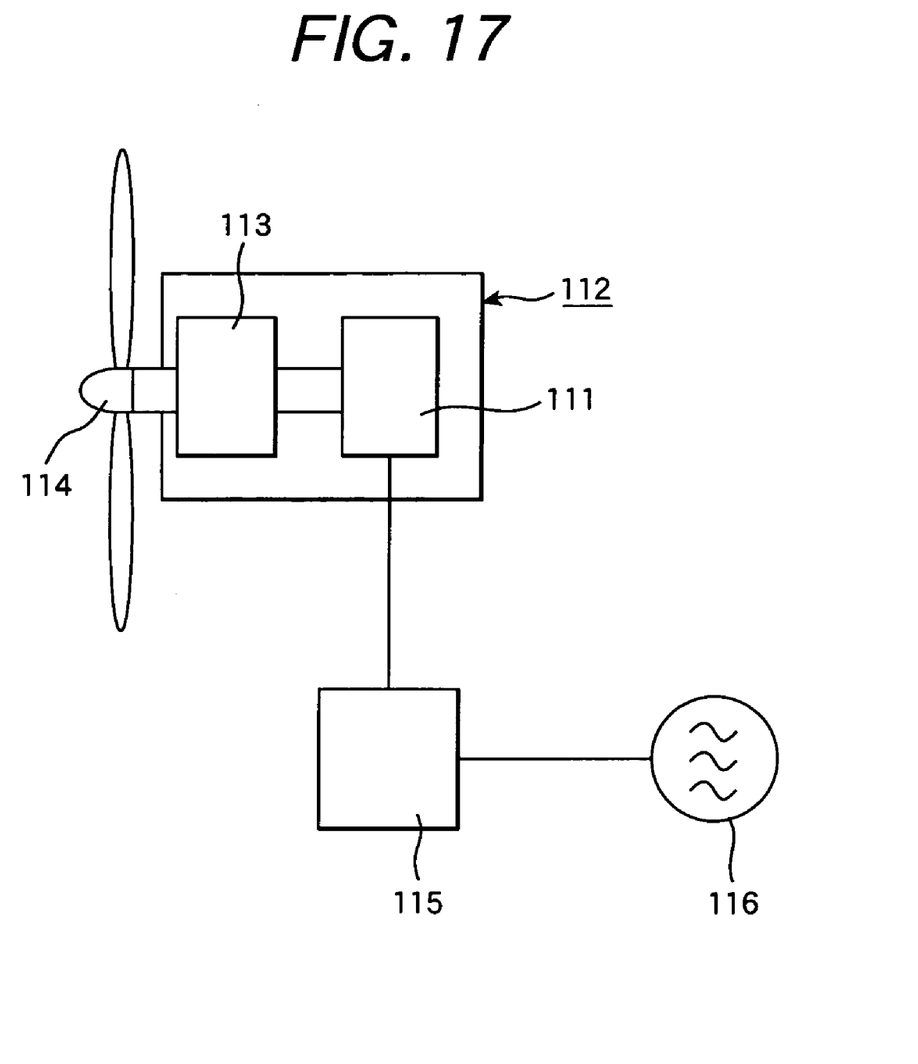
FIG. 17 is a diagrammatic view of a wind turbine apparatus to which the present invention is applied.

FIG. 17 shows a wind turbine electric power generation system to which the present invention is applied. The electric rotating machines shown in the first embodiment and the second embodiment 111 are connected to a wind turbine 114 by means of a speed up gear 113. The electric rotating machine 111 is connected to the electric power transmission system 116 by means of an electric power converter 115 to conduct electric power generation operation. In this embodiment, the wind turbine system as a driving force may be substituted by other driving forces such as water turbines, engines, gas turbines. Among the applications, the electric rotating machine of the embodiments may be most effectively applied to the wind turbine power generation system. The wind turbine 114 may be directly connected to the electric rotating machine 111. The above described embodiments are particularly advantageous for large scale wind turbine power generation systems because cooling of the electric rotating machine is conducted in small size.

What is claimed is:

1. A permanent magnet type electric rotating machine comprising a stator having a distributed winding, a permanent magnet rotor, an air cooler covering the stator, and a fan connected to a shaft, wherein the permanent magnet rotor is provided with at least one axial air passage in an axial direction thereof, and a plurality of duct pieces arranged to support a plurality of permanent magnets, and form a plurality of radial air flow passages extending in a radial direction connected to the at least one axial air passage so as to enable flow of cooling air from the at least one axial air passage into the air cooler and to enable cooling of the electric rotating machine by the cooling air driven by the fan, wherein each duct piece of the plurality of duct pieces is sandwiched in the axial direction between the permanent magnets of the plurality of permanent magnets so that the duct pieces prevent displacement of the permanent magnets in the axial direction.

2. The permanent magnet type electric rotating machine according to claim 1, wherein an iron core of the rotor is connected to the shaft by a plurality of spiders extending in the radial direction.

3. The permanent magnet type electric rotating machine according to claim 2, wherein the permanent magnet rotor comprises the iron core of the rotor connected to the shaft by a projection having a dovetail structure attached to at least one of the spiders.

4. The permanent magnet type electric rotating machine according to claim 2, wherein at least one permanent magnet of the plurality of permanent magnets is disposed in at least one permanent magnet slot of the iron core of the rotor.

5. The permanent magnet type electric rotating machine according to claim 1, wherein the stator comprises a plurality of radial air flow passages thereof arranged to face the plurality of radial air flow passages of the rotor.

6. The permanent magnet type electric rotating machine according to claim 1, wherein the permanent magnets of the plurality of permanent magnets have an arc form.

7. The permanent magnet type electric rotating machine according to claim 1, wherein the plurality of permanent magnets include flat plate permanent magnets arranged so as to form a letter V along a circumferential direction of the permanent magnet rotor when viewed in cross section, and wherein orientations of the adjacent flat plate permanent magnets forming the letter V are such that opposite polarities are facing each other.

8. The permanent magnet type electric rotating machine according to claim 1, wherein the plurality of permanent magnets include flat plate permanent magnets arranged so as to extend in the radial direction where the adjacent flat plate magnets are oriented so that the same polarities face each other.

9. The permanent magnet type electric rotating machine according to claim 1, wherein at least one permanent magnet of the plurality of permanent magnets is divided into a plurality of permanent magnet parts.

10. A wind turbine electric power generation system comprising a permanent magnet type electric rotating machine according to claim 1.

11. The permanent magnet type electric rotating machine according to claim 1, wherein the plurality of duct pieces is arranged to form at least one duct space extending in the radial direction in a central portion of the electrical rotating machine.

12. The permanent magnet type electric rotating machine according to claim 1, wherein at least one permanent magnet of the plurality of permanent magnets is disposed in at least one permanent magnet slot of an iron core of the rotor.

13. The permanent magnet type electric rotating machine according to claim 11, wherein at least one permanent magnet of the plurality of permanent magnets is disposed in at least one permanent magnet slot of an iron core of the rotor.

* * * * *